United States Patent [19]

Gandini et al.

[11] Patent Number: 5,197,083
[45] Date of Patent: Mar. 23, 1993

[54] MULTIMEDIA PROTOCOL INTERFACE FOR 64 KBIT/S DATA FLOW

[75] Inventors: Marco Gandini, Turin; Giovanni Ghigo, Luserna San Giovanni; Mauro Marchisio, Turin, all of

[73] Assignee: Sip-Societa' Italiana per l'Esercizio Delle Telecomunicazioni P.A., Turin, Italy

[21] Appl. No.: 619,307

[22] Filed: Nov. 28, 1990

[30] Foreign Application Priority Data

Nov. 30, 1989 [IT] Italy .................. 68058 A/89

[51] Int. Cl.⁵ .............................. H04B 3/46
[52] U.S. Cl. ........................... 375/10; 375/7
[58] Field of Search ............. 375/7, 8, 10, 36, 121; 370/84, 85.13, 85.14, 94.1, 94.2

[56] References Cited

U.S. PATENT DOCUMENTS 4,241,398 12/1980 Carll .................. 375/121
4,688,170 8/1987 Waite et al. ........... 375/121
4,884,287 11/1989 Jones et al. ........... 375/121

Primary Examiner—Stephen Chin
Attorney, Agent, or Firm—Herbert Dubno

[57] ABSTRACT

A multimedia protocol interface for 64K Kbit/s data flow, organized according to the frame structure specified in CCITT Recommendation H221 and transmitted and received according to the standard 64 kbit/s protocol or 256 kbit/s 10 M protocol, adapted to operate autonomously or aided by an external microprocessor and has a receiver, a transmitter, a control block and circuitry for the local test of the operation of the interface itself. The external microprocessor can read both the received data and the information relevant to the receiver conditions, and can also send data to be transmitted or can read information relevant to the transmitter conditions. The receiver receives the data and clock and synchronism signals and emits at the output the received data, associated with timing signals useful for the external devices connected to the interface for data recovery. Analogously, the transmitter emits the data, receives clock an synchronism signals and supplies data and timings to the external devices. The local test is carried out by verifying whether the receiver succeeds in recovering the synchronism from the signal emitted by the transmitter if the same interface, under microprocessor supervision, and if the data are correctly transmitted and received.

15 Claims, 9 Drawing Sheets

MULTIMEDIA PROTOCOL INTERFACE FOR 64 KBIT/S DATA FLOW

FIELD OF THE INVENTION

The present invention relates to digital information transmission equipment and more particularly, to a multimedia protocol interface for 64 kbit/s data flow, adapted to perform the operations required for handling the frame structure as specified in CCITT Recommendation H221.

BACKGROUND OF THE INVENTION

This Recommendation, entitled "Frame structure for a 64 kbit/channel in audio visual teleservices", describes how to organize data to be transmitted for audio and video teleservices on a single 64 kbit/s channel, wherein information encoding algorithms, frame structure and already existing CCITT Recommendations are optimized.

The 64 kbit/s channel is structured into octets transmitted at 8 kHz, wherein the eighth bit of every octet is used to form an 8 kbit/s subchannel, referred to as service channel, whereupon the signalling is transmitted and the remaining 7 bits, with 56 kbit/s transmission capacity, carry a variety of signals, among which are speech signals, data and speech signals, still pictures, data in an audio visual session, etc.

A succession of 80 octets forms a frame, containing the information necessary for the receiver to recover timing, and 16 successive frames form a multiframe, still containing timing information, properly allocated in the service channel. At the frame level a primary-importance information is transmitted; it is protected by error correcting codes which correct up to two errors and signal a third error. This information concerns data and frame structure organisation, which can change even during the transmission. There is another error signalling method, based on cyclic redundancy code (CRC), which detects the presence of errors in all the bits of the frame, but does not perform corrections. It is mainly used to evaluate transmission quality.

Prior to this protocol, CCITT had defined an analogous protocol identified by Y221, which had been implemented by an equipment designed within an ESPRIT project and presented in the paper entitled "MIAC-ESPRIT PROJECT 1057 FOR MULTIPOINT INTERACTIVE AUDIOVISUAL COMMUNICATION", issued in ESPRIT Technical Week, Brussels, 1988. However no information has been issued on the circuits contained in the apparatus.

The H221 and Y221 protocols differ from each other on a number of points, e.g. in the way of transmitting the information relevant to data organization within the frame, namely as regards the way of correcting possible transmission errors.

SUMMARY OF THE INVENTION

The multimedia protocol interface for 64 kbit/s data flow, provided by the present invention, in addition to allowing implementation of Rec. H221 specifications, allows easy connection to a microprocessor to carry out a plurality of functions or autonomous operation to carry out a single function. It can emit 64 kbit/s data for a standard digital channel or for an IOM type interface (ISDN Oriented Modular architecture) as e.g. the one fabricated by Siemens. It presents high flexibility in accepting data at variable rates from 64 kbit/s to over 2 Mbit/s for its transmitting part or in supplying analogously different rate data at the output of the receiving end. This part, in addition, can recover synchronism in a time which is 8 to 64 times shorter than required of H221 protocol specifications. Finally the present interface can transmit and receive unframed data and comprises circuits adapted to perform tests on the operative circuits.

The present invention provides a multimedia protocol interface for a 64 kbit/s data flow organized according to the frame structure as defined in Rec. H221 of CCITT, and emitted and received according to standard 64 kbit/s protocol or according to 10M 256 kbit/s protocol, which is capable of operating autonomously or aided by an external microprocessor, comprises a receiving block, a transmitting block, a control block and means for the local test of the interface itself. According to the invention, the receiver comprises:

a first block which generates internal timing signals relevant to the 64 kbit/s operating mode, on the basis of the clock and synchronism signals received with the data;

a second block which generates internal timing signals relevant to the operating mode according to a 256 kbit/s 10M protocol, on the basis of clock and synchronism signals received with the data;

a third block, consisting of a multiplexer, which selects the reception protocol forwarding the timing signals supplied by the first block or by the second block;

a fourth block searching in the data flow a synchronism word for aligning the received octet, on the basis of clock signals received from the third block;

a fifth block which performs frame and multiframe alignment generating suitable signals and correction of the errors of a word;

a sixth block, comprising a read only memory, which, on the basis of a possible erroneous word received from said fifth block, generates a signal on the position of possible bits of the word to be corrected or emits a signal indicating the impossibility of the correction owing to an excessive number of errors;

a seventh block, counting the octet number inside a submultiframe and generating frame synchronism signals, generates "interrupt" signals relevant to the receiving part and to the presence of errors in the receiver;

an eight block implementing an error signalling protocol based on code CRC, received together with the data from the fourth block, on the basis of timing signals received from the third block;

a ninth block converting into serial form the data received from the fourth block.

The transmitter comprises:

a tenth block generating internal timing signals relevant to the 64 kbit/s operating mode, on the basis of clock and synchronism signals;

an eleventh block generating internal timing signals relevant to the operating mode according to 256 kbit/s 10M protocol, on the basis of clock and synchronism signals;

a twelfth block selecting the transmission protocol by forwarding the timing signals supplied by the tenth block or the eleventh block;

a thirteenth block, which counts the octet number inside a submultiframe, generates frame synchronism signals and generates interrupt signals;

a fourteenth block which implements an error signalling protocol calculating code on the data to be transmitted, on the basis of the timing signals received from the twelfth block;

a fifteenth block which converts into parallel form data of subchannels 1 to 7 received in serial or parallel form and the data of subchannel 8;

a sixteenth block which mixes information relevant to the code and the word channel received or generated to form channel 8, on the basis of the timing signals received from the thirteenth block; and a seventeenth block which converts the data arriving from the fifteenth block and from the sixteenth block into serial form for the transmission.

The control block can comprise:

an eighteenth block, generating address and control signals for internal registers on the basis of address and control signals supplied by the external microprocessor or on the basis of signals, non microprocessor-controlled, for the choice of the interface operation between autonomous operation or microprocessor-controlled operation, mixes the interrupt signals of the receiver and of error and of the transmitter and sends them to the external microprocessor and renders available outside a few bits of protocol H221; and a nineteenth block containing the data for tests, the type of test and the configuration relevant to the type of operation.

The local means that allows the interface test by connection of the output of the transmitter to the input of the receiver.

The first block can comprise:

a first counter, which enumerates the bits inside the octet received on the basis of a clock signal (61a) and on a parallel loading signal;

a first multiplexer allowing the choice between the signals generated by the fourth block and the signals coming from outside the interface, on the basis of a signal generated by the external microprocessor;

a twentieth block generating two octet clock signals (12b) phase shifted between each other by a clock interval, on the basis of the counting (91) supplied by the counter;

a twenty-first block which generates a bit masking signal and reset signal for calculating the code on the basis of the counting supplied by said first counter.

The second block comprises:

a second counter, which enumerates the bits inside the octet received on the basis of a clock signal and a parallel loading signal;

a first decoder which generates an active signal in correspondence with the first or second 16 clock intervals starting from the value 0 of the second counter (RTD), which supplies the two most significant bits;

a twenty-second block which generates two octet clock signals phase-shifted between each other by a clock interval by operating on the signals supplied by the second counter and by the first decoder; and a twenty-third block which generates a bit masking signal and a reset signal for computing the code, by operating on the signals supplied by the second counter and the first decoder.

The fourth block can comprise:

a first shift register, converting the arriving serial flow into parallel form using for the timing the signals supplied by the third block;

a bank of shift registers, each connected to a parallel output of the first shift register, timed by signals supplied by the third block and housing a combinatory circuit for recognizing the synchronism word FAS;

a second multiplexer which sequencially scans the signals at the output from said bank of shift registers, under the control of a signal supplied by the third block;

first finite state automaton, which on the basis of the signal received from the second multiplexer checks whether and in which register of the bank there is the synchronism word FAS, indicating that its identification has taken place.

The fifth block can comprise:

a second finite-state automaton which checks whether frame synchronism has actually been achieved or has been accidentally lost, by looking for the synchronism word FAS and signalling the result to the seventh block, to the fourth block and to a third finite-state automaton, the signals from which effects the check arriving with a start signal from the fourth block and the timing signals arriving from the seventh block;

a third finite-state automaton which checks whether frame synchronism has been actually achieved or has been accidentally lost, signalling its result to the seventh block, the signals whereupon it effects the check arriving from the second finite-state automaton and from a twenty-fourth block which stores the information relevant to multiframe structure it receives from the fourth block, by recognizing a multiframe synchronism word, and which divides the word BAS and its parity by a generator polynomial, supplying the rest at the output;

a twenty-fifth block, housing a multiplexer which connects input connections with the output connections and an error detector for word BAS, which indicates the presence of one or of two errors which have been corrected or of three errors which could not be corrected; and a twenty-sixth block which effects the actual correction of the word BAS arrived from the fourth block by storing it in a a register and complementing the erroneous bits signalled by the sixth block, a register being provided for memorizing the data relevant to the auxiliary channel AC.

The seventh block comprises:

a third octet and frame counter, which, on the basis of an octet clock signal generates timing signals for the whole receiver, after reaching frame synchronism and octet synchronism;

a first logic, which on the basis of signals coming from said control block and from said fifth block, starts the third counter in a synchronous mode;

a fourth sub-multiframe counter, which on the basis of a portion of counting supplied by said third counter indicates at the output if the arriving frame is odd or even;

a third multiplexer which on the basis of the counting supplied by the third counter generates a frame synchronism with variable duty cycle;

a second conditioning logic, which generates eight clock pulses positioned starting from octet 16 to octet 80 in correspondence with the auxiliary channel AC, on the basis of the counting supplied by the third counter and of an octet clock signal;

a fifth auxiliary channel counter, which obtains the counting of the pulses generated by said second logic for the external microprocessor; and a twenty-seventh block generates an interrupt signal, which has origin in correspondence with the transitions at the output of said second logic or in correspondence with error situations inside the receiver.

The eighth block comprises:

a twenty-eighth block calculating the cyclic redundancy code CRC on the serial data flow coming from the fourth block;

a twenty-ninth block which stores the CRC calculated by the twenty-eighth block and compares it with the receiver code;

a thirtieth block which stores the result of the comparison made by the twenty-ninth block and renders it available to the external microprocessor and to the twenty-seventh block; and a thirty-first block, storing information relevant to protocol H221 and controlling CRC bits.

The tenth block can comprise:

a sixth counter which enumerates the bits inside the octet to be transmitted on the basis of a 64 kHz clock signal;

a thirty-second block, which on the basis of an octet synchronism signal emits a parallel loading signal for the sixth counter;

a thirty-third block which generates an octet clock signal on the basis of the counting performed by the sixth counter; and a thirty-fourth block, which generates a bit masking signal, a transfer signal and a reset signal for calculating the CRC on the basis of the counting performed by the sixth counter.

The eleventh block preferably comprises:

a seventh counter, which enumerates the bits inside the octet to be transmitted on the basis of a 256 kHz clock signal and is adapted to be loaded in parallel;

a second decoder, which on the basis of the counting supplied by the seventh counter generates a signal active in correspondence with the first or second clock intervals starting from value 0;

a thirty-fifth block, which generates a clock signal and a loading signal for the check of loading and shift operations in said seventeenth block; and a thirty-sixth block, which generates a bit masking signal and a reset signal for computing CRC by said fourteenth block.

The thirteenth block can comprise:

an eighth counter of octet and frame, which on the basis of an octet clock signal generates timing signals for the whole transmitter;

a third logic, which on the basis of signals coming from the control block and from the external microprocessor, synchronously starts the eighth counter;

a ninth sub-multiframe counter, which on the basis of a part of a count supplied by the eighth counter, emits a signal (41c) used to enumerate the outgoing frames from 0 to 15, generating the timing for the building of multiframe structure;

a fourth multiplexer which on the basis of the count supplied by the eight counter, generates a frame synchronism with variable duty cycle;

a fourth conditioning logic, which generates eight clock pulses positioned starting from octet 16 to octet 80 in correspondence with the auxiliary channel, on the basis of the counting supplied by the eight counter and of an octet clock signal; and a tenth counter of auxiliary channel, which obtains the counting (1a) of the pulses generated by said fourth logic (TLC) for the external microprocessor; and a thirty-seventh block generating an interrupt signal, which has its origin in correspondence with the transitions at the output of the fourth logic.

The fourteenth block can include:

a thirty-eighth block which calculates the cyclic redundancy code CRC on the serial data flow coming from the seventeenth block; and a thirty-ninth block which memorizes the CRC computed by said thirty-eighth block and emits it in serial form.

The fifteenth block can have:

a second shift register, which receives the data in serial form and the relevant clock signal and emits them in parallel form;

a first register which memorizes the data placed in the position B2 to be transmitted according to 10M protocol;

a fifth multiplexer, which transfers to the output the data supplied by said second shift register or by the first register;

a second register which memorizes the data under parallel form supplied by the microprocessor; and a sixth multiplexer, which transfers to its output the data supplied by the fifth multiplexer or by the second register.

The sixteenth block can comprise:

a third register, containing word FAS in wired form;

a third shift register for calculating the parity of word BAS;

a fourth shift register, to supply in parallel form and in serial form the word BAS to be transmitted, received and from the external microprocessor;

a fourth register, to supply in parallel channel AC to be transmitted, received from the external microprocessor;

a fifth register, to supply in parallel the data relevant to the multiframe to be transmitted, received from the external microprocessor; and a seventh multiplexer, which mixes the data supplied by said registers on its request with signals relevant to CRC and to subchannel 8, forming the frame and multiframe structure under the control of timing signals.

The eighteenth block comprises:

a sixth register, for writing by the microprocessor;

a third decoder which receives a portion of the data memorized in the sixth register and uses them to generate enabling signals in reading and writing as a function of a reading/writing signal;

a foutieth block mixing the interrupt signals of the receiver, of the emitter and of error; and a fourth decoder which receives the control signals from the microprocessor and on the basis of their values selects different parts of the internal logic, confirms the data reception by implementing thus an asynchronous protocol and resets the interrupt conditions.

The nineteenth block can include:

a seventh register and an eighth register, wherein the microprocessor writes words for loading the counters contained both in the transmitter, and in the receiver for test;

a ninth register, wherein the microprocessor writes words for the configuration of the interface in normal operation; and a tenth register, wherein the microprocessor writes control information for the circuit test.

BRIEF DESCRIPTION OF THE DRAWING

The foregoing and other characteristics of the present invention will be made clearer by the following description of a preferred way of embodiment thereof, given by way of a non limiting example, and by the annexed drawings wherein.

SPECIFIC DESCRIPTION

Figure 1:
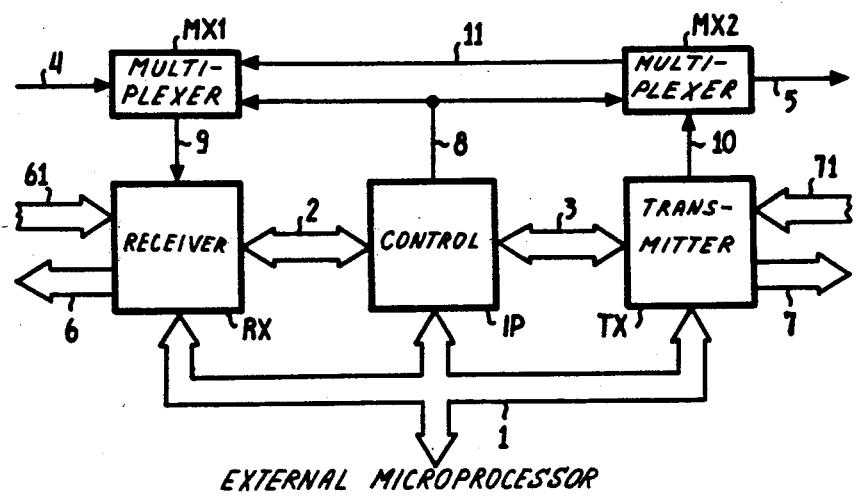
FIG. 1 is a general block diagram.

The interface shown in FIG. 1 comprises three main blocks, consisting of receiving block RX, transmitting block TX and control block IP, adapted to allow the dialogue with an external microprocessor. Data and commands for RX and TX, possibly coming from the microprocessor on connection 1, transit through block IP and multiple connections 2 and 3. Through connection 1 the external microprocessor can read both the data received and information relevant to the receiver state, and can as well send data to be transmitted or it can read information relevant to the transmitter state.

Receiver RX receives data on wire 9 and clock and synchronism signals on connection 61 and emits at the output on connection 6 the received data, associated with timing signals useful for the external devices connected to the interface for data recovery.

Analogously, transmitter TX emits the data on wire 10, receives clock and synchronism signals on connection 71 and supplies data and timings for the external devices on connection 7.

The input wire 9 to receiver can be connected to the wire 4 for the input data to interface or to wire 11, according to the position wherein there is a multiplexer MX1, controlled by the signal on wire 8 coming from block IP. The transmitter can send its signals present on wire 10 either to the wire 5 for the data outgoing from interface or to wire 11, according to the position in which there is a multiplexer MX2, still controlled by the signal on wire 8. The connection established through wire 11 allows the transmitter to be closed on the receiver to carry out a local interface test, both in the validation phase and in the normal line working phase. The external microprocessor, through IP and wire 8, inhibits the transfer from wire 10 to wire 5 and enables data passage from wire 10 to wire 11, interrupting the passage from wire 4 to wire 9. The test takes place by checking whether the receiver can recover the synchronism from the signal emitted by the transmitter, under microprocessor supervision, and whether the data are correctly transmitted and received.

Figure 2:
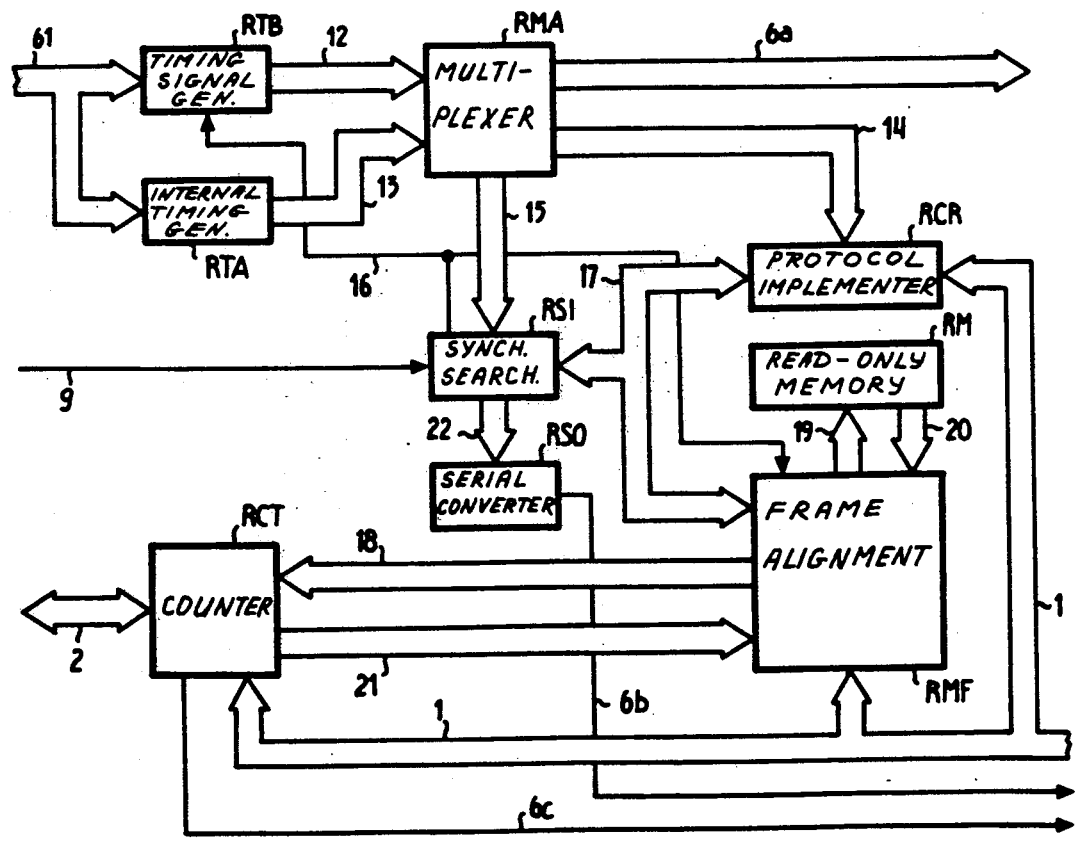
FIG. 2 is a block diagram of the receiver denoted by RX in FIG. 1.

The receiver block diagram is shown in FIG. 2. Clock and synchronism signals arrive through connection 61, already mentioned, at block RTB which generates the internal timing signals relevant to the standard 64 kbit/s working mode.

Connection 61 enters also a block RTA, which analogously to RTB, generates the internal timing signals relevant to working mode according to 256 kbit/s protocol IOM.

The signals generated by RTB and RTA are made available on connections 12 and 13, respectively, and are a clock signal relevant to the single bit, a signal indicating the position of the bit received inside the octet, some clock signals relevant to the octet, duly phase-shifted between each other, and some signals for calculating CRC, which are a masking signal, a clock signal and a reset signal.

The signals present on connections 12 and 13 arrive at a multiplexer RMA, which carries out the function of selecting the reception protocol, by forwarding the timing signals relevant to either working mode towards connections 14, 15 and 6a.

The clock signals used for correct sampling of the input data, received through wire 9, arrive at RSI through connection 15. Block RSI has the task of searching for a particular synchronism word, referred to as FAS (Frame Alignment Signal) according to protocol H221, which allows it to correctly align the octet received. The octet aligning operation requires the phasing of the signals indicating the bit received in block RTB, which is obtained by sending a suitable signal on wire 16.

After achieving octet alignment, the significant information concerning the frame structure appears on connection 17. From this instant circuit control is carried out by block RMF, which first looks for frame alignment, then for multiframe alignment by carrying out the relevant procedures specified in protocol H221. Once the sequences relevant to said alignment are recognized as valid, RMF supplies connection 18 with signals for phasing the signals indicating the position of the data received within the frame and multiframe structure, the signals being generated by a block RCT, which will be described hereinafter.

RMF contains also a circuit for correcting the errors which can possibly take place in words referred to as BAS (Bit rate Allocation Signal), according to protocol H221. To obtain that, RMF calculates the rest of the division of the 16-bit word, containing the BAS and relevant parity calculated by the transmitter, for a generator polynomial, defined by protocol H221, and sends it on connection 19 to a block RM. This block returns on connection 20 the information on the position of possible bits of word BAS to be corrected. Block RM comprises a ROM memory, whose content has been determined by computing all the possible rests derived from BAS words, plus the relative parity, affected by one, two or three errors and associating with these rests some binary words having some ones in the positions corresponding to the erroneous bits of the single word BAS. In case of three errors, a particular configuration is presented on connection 20, which configuration is easy to recognize, which signals the correction impossibility. In fact if more than two errors occur, self correction is impossible and the external microprocessor can be informed through connection 1.

Block RCT, already mentioned, carries out three main functions. It counts the number of the octet within a submultiframe formed by 160 octets. The result of the counting is sent through connection 21 to block RMF, which uses it to check the maintenance of the synchronism.

As a second function, block RCT generates frame synchronism signals used for the control of input modality of the data (series or parallel) and of the "interrupt" signals.

Finally as a third function block RCT generates the "interrupt" signals relevant to the receiving part and to the presence of receiver errors. On connection 2 RCT receives signals of test, reset, synchronisation and enabling for the access to the internal registers and returns signals of "interrupt" and masking. Through connection 1 the external microprocessor can reach the internal registers.

Block RCR implements an error signalling protocol based on code CRC, according to specification H221. Through connection 14 RCR receives the timing information selected by RMA and through connection 17 receives the data whereupon it can calculate CRC, as well as comparaison CRC. The computation result can be read by the external microprocessor through connection 1.

Block RSO has the task of converting into serial form the data received, which are supplied by RSI on connection 22, and of rendering them available outside on wire 6b. On connection 6a, at the output of multiplexer RMA, there are timing signals of the data on wire 6b, whilst on wire 6c, at the output of block RCT, there is frame synchronism. Connection 6a and wires 6b, 6c form the multiple connection denoted by 6 in FIG. 1.

Figure 3:
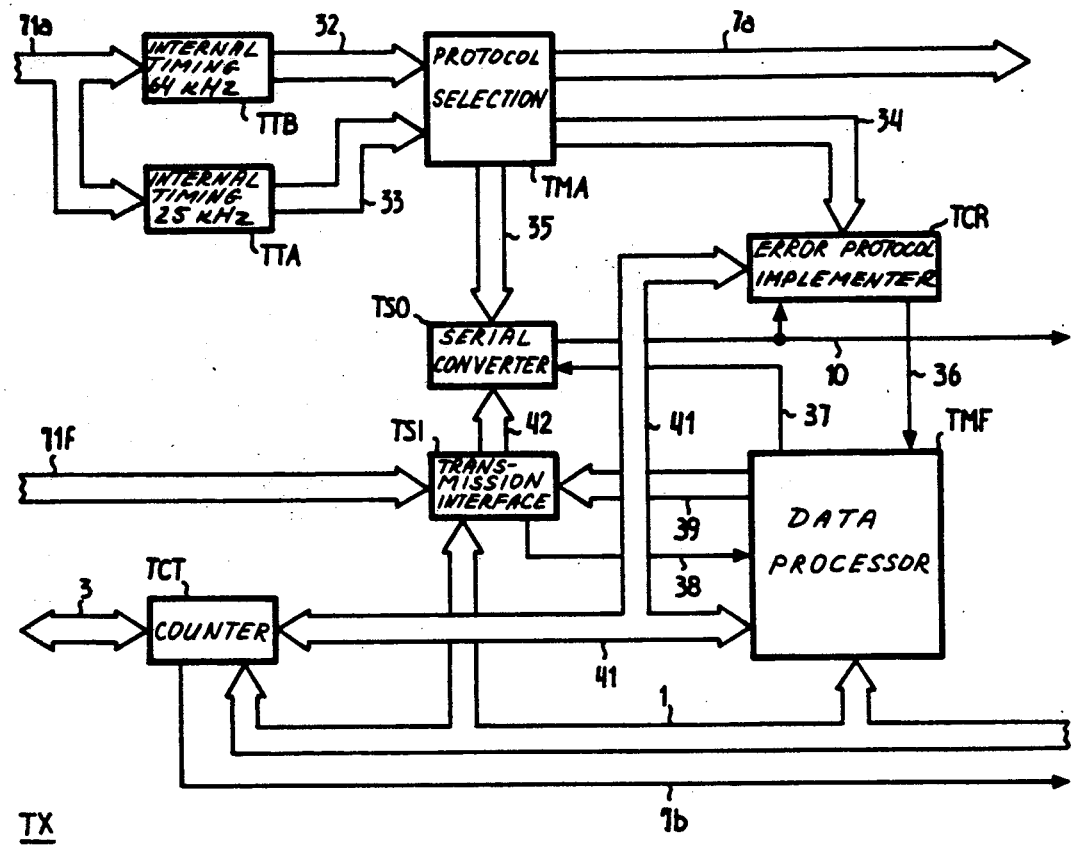
FIG. 3 is a block diagram of the transmitter denoted by TX in FIG. 1.

The transmitter block diagram is shown in FIG. 3. Clock and synchronism signals arrive through connection 71a at block TTB which generates the internal timing signals relevant to standard 64 kbit/s working mode.

Connection 71a also enters a block TTA, which analogously to TTB, generates internal timing signals relevant to the working mode according to 256 kbt/s IOM protocol.

The signals generated by TTB and TTA, made available on connections 32 and 33 respectively, are a clock signal relevant to the single bit, a signal indicating the position of the bit received within the octet, some clock signals relevant to the octet, duly phase shifted between each other, and some signals for calculating the CRC, which are a masking signal, a clock signal and a reset signal.

The signals present on connections 32 and 33 arrive at a block TMA, which carries out the function of selecting the transmission protocol, by forwarding the timing signals relevant to either working mode towards connections 34, 35 and 7a.

Clock signals used for the correct data transmission, emitted at the output on wire 10, arrive at TSO through connection 35. Block TSO is to convert the data arriving on connection 42 and on wire 37 into serial form to render them afterwards available on wire 10.

Block TCT carries out three main functions. It counts the octet number inside a 160-octet submultiframe. The counting result is sent through connection 41 to block TMF, which uses it to correctly position the data on wire 37.

As a second function block TCT generates on wire 7b some frame synchronism signals used to control the modality of data emission (series or parallel) and on connection 3 some interrupt signals.

Finally, as a third function block TCT generates interrupt signals relevant to the transmitting part.

On connection 3 TCT receives test, reset, synchronising and enabling signals for the access to the internal registers and returns interrupt and masking signals. Through connection 1 the external microprocessor can reach the internal registers.

Block TCR implements an error signalling protocol, based on code CRC, according to specifications H221. Through connection 34 TCR receives timing information selected by TMA and through connection 41 receives the data whereupon it can calculate CRC. The computed CRC is sent to TMF on wire 36 to be mixed with the other signals.

The data to be transmitted, relevant to subchannels 1 to 7, enter a block TSI. They can be supplied both in serial form through connection 71f, together with a clock signal, and in parallel form through connection 1 arriving from the external microprocessor.

Block TSI, under the control of the signals coming from block TMF on connection 39, transfers at the output on connection 42 the data of subchannels 1 to 7 received under serial or parallel form, taking also into account the transmission protocol (64 kbit/s or 256 kbit/s), and on wire 38 the data of subchannel 8 for a possible manipulation by block TMF. As known, on subchannel 8 there are transmitted synchronism word FAS, word BAS with relevant parity and auxiliary channel AC (Application Channel).

Block TMF is to mix said information, characteristic of protocol H221, and to present it at the suitable instant on wire 37. Word FAS is wired in block TMF, word BAS is calculated by TMF by using the coefficients of a suitable polynomial defined in the protocol, which are also sent at the suitable instant on wire 37, and the data relevant to channel AC are supplied by the external microprocessor on connection 1 or, under serial form, by TSI on wire 38.

The information relevant to the instant at which the data on wire 37 are to be emitted, is supplied to block TCT by connection 41.

Figure 4:
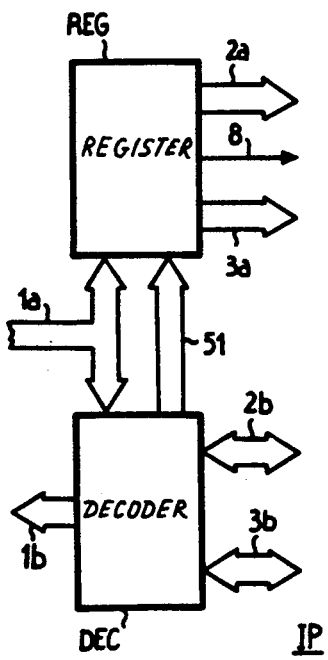
FIG. 4 is a block diagram of the block denoted by IP in FIG. 1.

The block denoted by IP in FIG. 1 is shown in FIG. 4.

It comprises a block denoted by DEC, which comprises some decoding circuits which have the task of generating address and control signals of the registers within the interface on the basis of the address and control signals supplied by the microprocessor on connection 1a. Onto the sameconnection 1a a signal, which is not microprocessor controlled, can be sent from the outside for choosing between two possible interface operating modes, namely autonomous operation or operation controlled by an external microprocessor.

Through connection 2b DEC receives from the receiver some signals which represent the receiver and error interrupt signals, as well as two signals which represent bits A and E of protocol H221. Said bits are usually read by the microprocessor in the receiver registers. If on the contrary the interface works in the autonomous way, they are brought to block DEC in order to be rendered available at the outside on two pins.

Through connection 3b DEC receives from the transmitter some signals which represent its interrupts.

The interrupt signals are mixed in DEC and sent on a single wire to the microprocessor through connection 1b, whereupon there is also a signal which synchronises data exchange.

On connection 51 control and address signals are emitted for the registers common to the receiver and transmitter, contained in a block denoted by REG, on connection 2b signals for the receiver registers and on connection 3b signals for the transmitter registers.

Block REG contains four registers, three of which are devoted to test and one is a configuration register.

Two out of three test registers contain test data and one contains a datum relevant to the type of test, which is emitted on wire 8 for data recirculating control.

The configuration register allows transmitter and receiver to be configurated according to the selected working mode and some functions [e.g. CRC computation, multiframe counting and the like], which are characteristic of the frame structure of protocol H221, to be enabled and inhibited.

The registers outputs are lead to the receiver through connection 2a and to the transmitter through connection 3a. Connections 1a and 1b, 2a and 2b, 3a and 3b form respectively connections 1,2,3 of FIG. 1.

Figure 5:
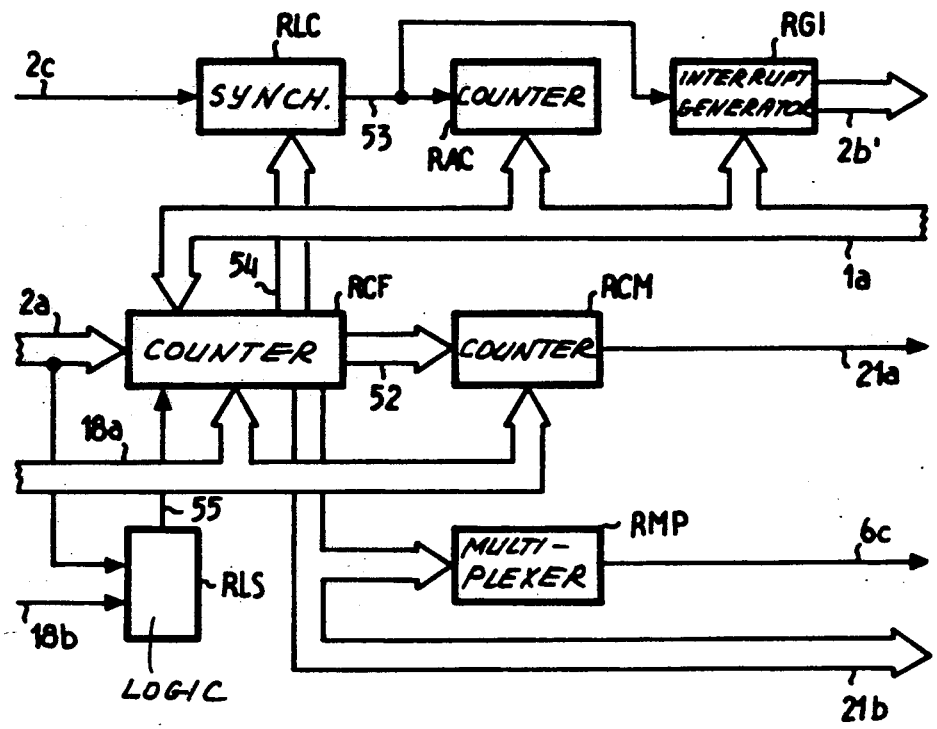
FIG. 5 is a block diagram of the block denoted by RCT in FIG. 2.

The block denoted by RCT in FIG. 2 is shown in more details in the block diagram of FIG. 5.

On connection 2a an octet clock signal arrives, which is sent to an octet and frame counter RCF, which generates as a consequence the timing signals for the whole receiver. The counting is started in a synchronous way by the signal on wire 55 emitted by a logic RLS, reset by the signal present on wire 2a and controlled by the signal on wire 18b, which signals that the octet synchronism has been reached. Vice versa, the signal which confirms that frame synchronism has been reached arrives through connection 18a and causes a starting value be loaded in counter RCF. The frame counter state can be examined by the external microprocessor by a suitable request carried out through connection 1a.

The bits outgoing from RCF, representing the counting carried out, result available on connection 21b and are used by the remaining receiver circuits. A part of said bits, present on connection 52, are lead to a subsequent sub-multiframe counter RCM, which supplies a signal used to indicate whether the arriving frame is even or odd, giving the relevant signalling on wire 21a.

Connection 21b is also connected to a multiplexer RMP, which uses the received signal to generate a frame synchronism with variable duty-cycle, available on wire 6c.

An auxiliary channel counter RAC counts with modulo 8 the clock signal pulses received at the input on wire 53. Said pulses are generated by a conditioning logic RLC on the basis of the octet clock signal present on wire 2c, taking into account the value that the frame counter RCF renders available on connection 54. More particularly, RLC generates on wire 53 eight clock pulses (one every eight octet) located starting from octet 16 to octet 80, in in correspondence with auxiliary channel AC. The counting carried out by RAC is read by the external microprocessor through connection 1a.

A block RGI generates an "interrupt" signal, which can have two different origins, one in correspondence with the transitions at the output of logic RLC, the other in correspondence with error situations inside the receiver, received through connection 1a. The interrupt signal on wire 2b' is then sent to block IP (FIG. 4) to be mixed with the transmitter interrupts.

On wire 2a can be also sent signals from the microprocessor for loading suitable binary configurations in counter RCF to be used during the test phase.

Figure 6:
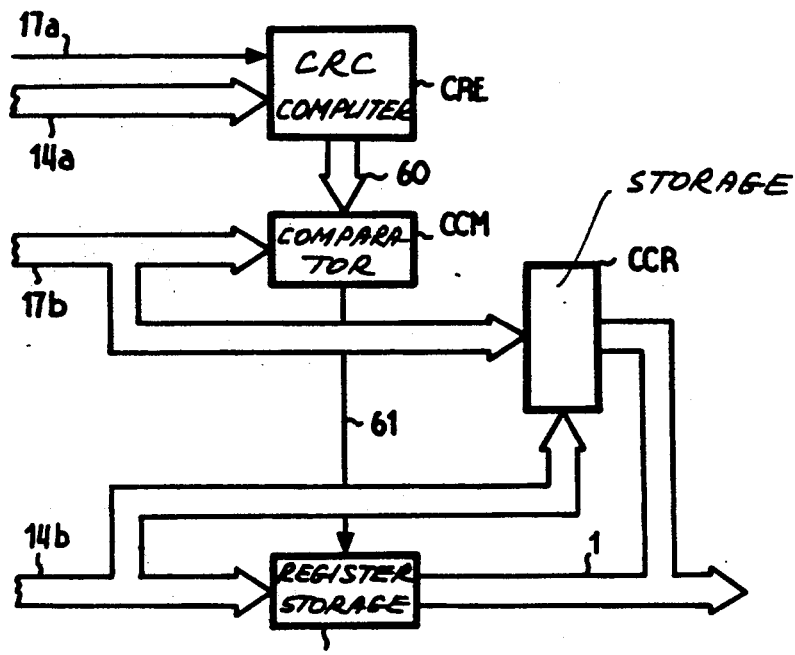
FIG. 6 is a block diagram of the block denoted by RCR in FIG. 2.

The block denoted by RCR in FIG. 2 is shown in greater detail in the block diagram of FIG. 6.

Wire 17a carries the serial data flow whereupon CRC is computed. Block CRE computes CRC in the usual ways by using the timing signals present on connection 14a, formed by a clock and a reset signal.

The computed CRC code is supplied on connection 60 to be forwarded to a block CCM, which memorises it and compares it with the code received on connection 17b, calculated by the remote transmitter for the same data set. The result of the comparison, which indicates whether the data received are correct or erroneous, is supplied to the output on wire 61. It is stored in suitable registers contained in a subsequent block CCE, in order to be made available to the external microprocessor and to interrupt logic RGI (FIG. 5) on connection 1. Timing signals for error signal storage are supplied to block CCE on connection 14b.

Finally, a block CCR stores information relevant to protocol H221, namely bits A and E, contained in the first 8 octets of the odd frame. Besides CCR checks whether all CRC bits are at high logic level, which condition occurs when the remote transmitter has suspended CRC computing. Since these signals are valid on connection 17b only for one octet, their storage is carried out on the basis of the timing signals present on connection 14b. The stored information is then made available to the external microprocessor on connection 1.

Figure 7:
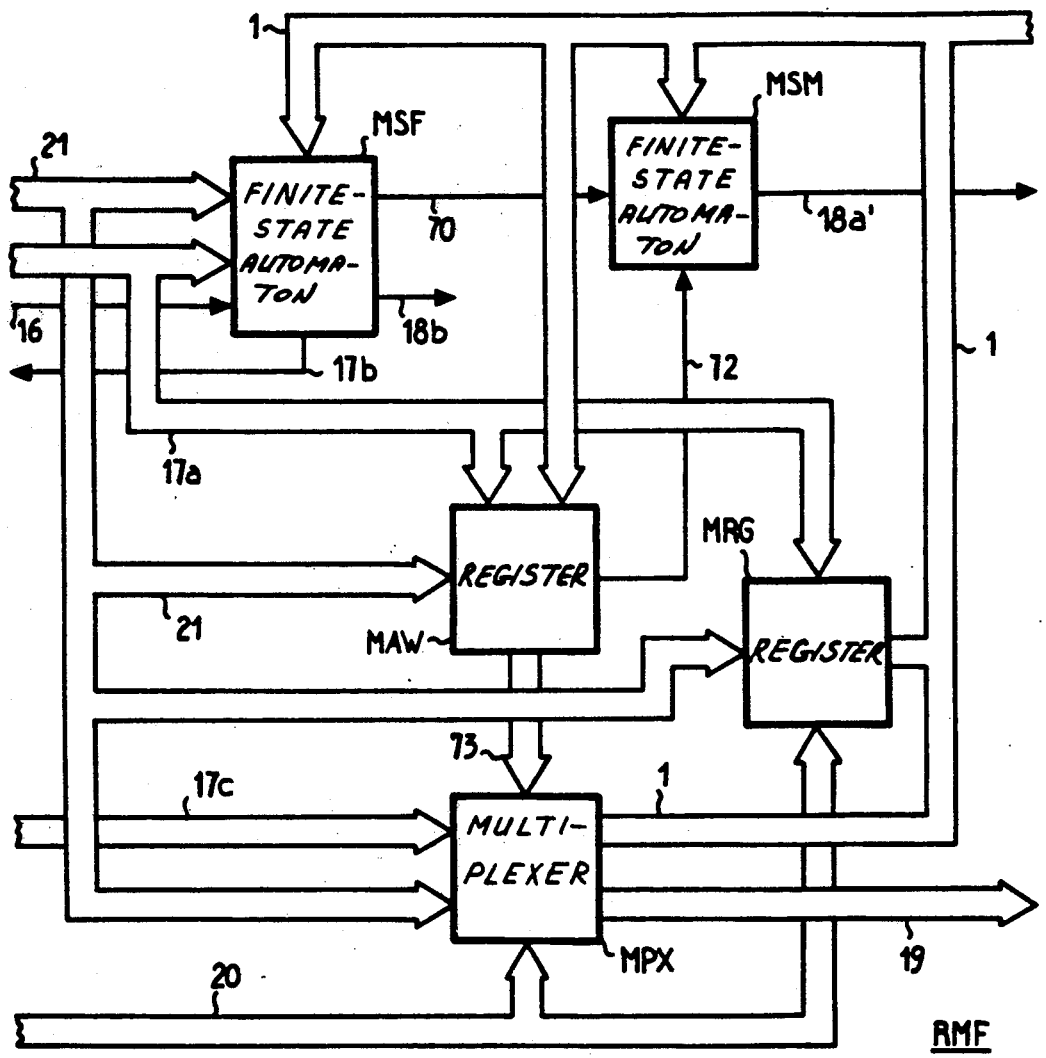
FIG. 7 is a block diagram of the block denoted by RMF in FIG. 2.

The block denoted by RMF in FIG. 2 is shown in greater detail in the block diagram of FIG. 7.

To check whether the frame synchronism has been actually reached or has been accidentally lost, a suitable procedure is followed, defined in protocol H221, by using a finite state automaton MSF with three bits (8 possible states). Frame synchronism is considered as reached when in an even frame word FAS, composed of 7 bits, is recognized, in the successive frame an eighth bit of completion of word FAS, which renders it FAW, is recognized, and finally in the subsequent frame the word FAS is recognized. If in anyone of said three steps the recognition fails, it has to start from the very beginning, otherwise the lock to frame synchronism is considered as valid.

From this point on, one can check a possible loss of the frame synchronism. This loss is taken as real if for three subsequent times the circuit does not recognize the word FAW, i.e. word FAS in an even frame, the eighth completion bit in the subsequent odd frame.

The finite state automaton is started by block RSI (FIG. 2), when the latter has reached octet synchronism, by a suitable signalling sent on wire 16. Starting from this instant automation RMF of FIG. 7 begins examining the signals arriving on connection 17a to search for frame synchronism. Said signals consist of a bit denoting the presence of word FAS, received on the eighth octet bit, generated by block RSI (FIG. 2), and in the completion bit of the word FAS. The optimal sampling instant of said signals is obtained by timing signals present on connection 21. A signal of frame synchronism achieved on wire 18b synchronises the octet counter contained in block RCF of RCT (FIG. 5).

In the case in which frame synchronism is not reached or is lost, a signalling is sent onto wire 17b for block RSI (FIG. 2), which resets the circuit for searching the octet synchronism, so as to search the eighth bit in another position.

The external microprocessor reads through connection 1 the three state bits of the finite state automaton MSF to check its development in time. The third state bit, which represents the reached synchronism condition, is sent through wire 70 to a block MSM, which still consists of a finite state automaton, able to control the multiframe synchronism. In this case as soon as a suitable bit is recognized on wire 72, which signals the presence of multiframe synchronism word, the synchronism is taken as valid without any further check. A signal of synchronism reached on wire 18a' synchronises the frame counter RCF contained in RCT (FIG. 5).

Starting from this instant MSM begins checking if for three successive times multiframe synchronism results lost. As already mentioned for MSF, MSM state bits can be read by the external microprocessor through connection 1.

Block MAW houses a 16-bit register wherein the received information relevant to a multiframe structure, present on connection 17a, is serially loaded. Said information comprises the multiframe synchronism word, which can be recognized by MAW and whose presence can be communicated to MSM through wire 72.

Through connection 1, the external microprocessor can read some registers, housed in MAW, wherein the data relevant to the multiframe structure are stored, i.e. the bits which number the present multiframe, the bit which indicates whether the numbering is active and other reserved bits. The timing signals for multiframe information recovery arrive through connection 21.

Block MAW recovers from connection 17a the data relevant to word BAS and to its parity, calculated by the remote transmitter, and divides said data by the generator polynomial, whose coefficients are defined by protocol H221. As known, the divider consists of a shift register feedback in the stages specified by the polynomial. The rest of the division is available on connection 73.

In the standard operation, block MPX, consisting of a multiplexer and of an error detector on the word BAS, connects connection 19 with connection 73, while, upon microprocessor request, connection 1 can be connected to connection 17c with the aim of reading the octet received by block RSI (FIG. 2).

During the test phase, connection 21 is connected to connection 19, while upon microprocessor request connection 20 is connected to connection 1. Which allows sequential addresses to be generated on connection 19 by exploiting time base RCT (FIG. 2) and also allows the microprocessor to read the contents of connection 20.

The error detector on word BAS, contained in MPX, is a logic circuit indicating the presence of one or two errors which have been corrected or of three errors which could not be corrected. This logic can operate thanks to the presence on connection 20 of a code, emitted by block RM (FIG. 2), which appears when there are three errors, while in case of one or two errors the code denotes the position of the erroneous bits.

The actual correction of said errors in word BAS is performed in block MRG, which stores in an 8-bit register the word BAS containing the possible errors, by reading it from connection 17a. MRG receives from connection 20 the word indicating the position of the erroneous bits, performs the inversion of the erroneous bits and stores the result in another 8-bit register, which can be read by the microprocessor through connection 1.

MRG contains also an 8-bit register, which can be read by the microprocessor, to store the data relevant to auxiliary channel AC, present at a certain instant on connection 17a. The information on the optimal reading instant of the data, relevant to words BAS and AC, is obtained from timing signals present on connection 21.

Figure 8:
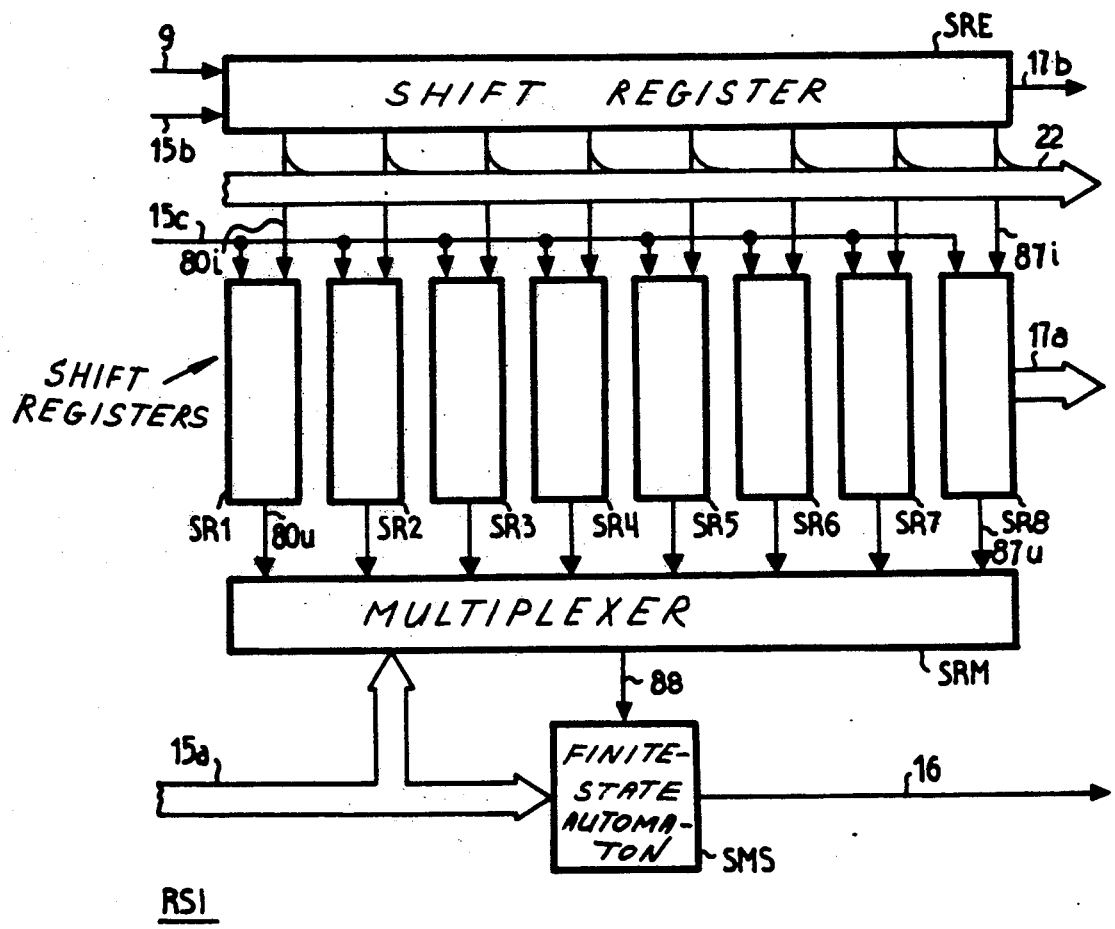
FIG. 8 is a block diagram of the block denoted by RSI in FIG. 2.

The block denoted by RSI in FIG. 2 is shown in greater detail in the block diagram of FIG. 8.

The serial flow arriving on wire 9 is converted into parallel form by an 8-bit shift register SRE, timed by the signal present on wire 15b. Every eight shift steps the data at the outputs 80i, 81i, ... 87i is stored in a bank of eight shift registers SR1,SR2, ... ,SR8, of 7 cells each, with the only exception of RS8 which owns 8 cells. The storage is timed by the clock signal present on wire 15c.

Each of the registers SR1,SR2, ... ,SR8 contains inside a combinatory circuit for recognizing a well determined binary configuration, corresponding to synchronism word FAS. The outputs of these combinatory circuits, connected to wires 80u, 81u, ... ,87u, change their logic level when the synchronism word is recognized and are sent to the inputs of a multiplexer SRM, controlled by the signal present on connection 15a.

SRM sequentially scans the signals at the outputs 80u, ... ,87u of the bank of registers and transfers them to its output 88. The latter enters a 1-bit finite state automation SMS, which verifies whether and in which register SR1, ... ,SR8 the synchronism word is present. The synchronism word identification occurred is denoted by SMS by a suitable signal on wire 16, which synchronises the counters in time base RTB (FIG. 2). In this way the phase of the timing signals present on connection 15 (15a, 15b, 15c) is caused to vary, in order to bring the channel containing the synchronism word into register SR8. The timing for finite state automation SMS is performed by the signals present on connection 15a.

Said operations allow the octet synchronism to be established, that is why at the instant in which the synchronism word is found on SR8 on, on connection 17a there are certainly available the data of channel 8, containing words BAS,FAS,AC etc. Since some of said data are composed of 8 bits, SR8 has 8 stages.

On connection 22 there are available the data received, converted into parallel form, to be transferred to block RSO (FIG. 2), where they are adapted for a serial output.

The output 17b still presents the serial data flow received at the input on wire 9, delayed by 9 clock intervals, and used for computing CRC.

Figure 9:
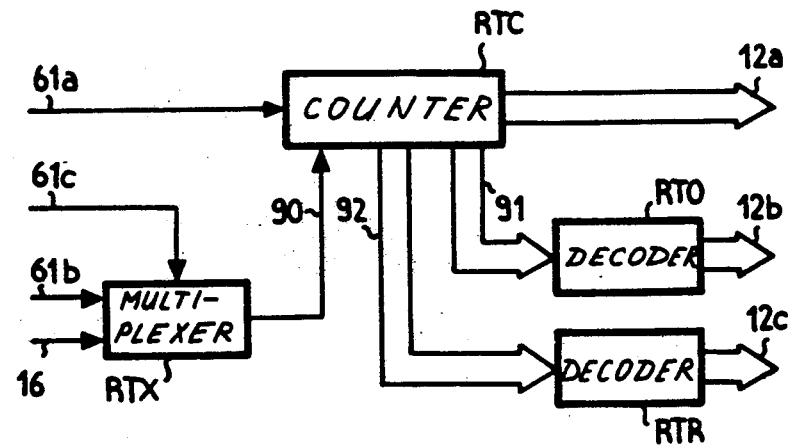
FIG. 9 is a block diagram of the block denoted by RTB in FIG. 2.

The block denoted by RTB in FIG. 2 is shown in greater detail in the block diagram of FIG. 9.

It comprises a block RTC, consisting of modulo-8 counter, which numbers the bits inside the octet, on the basis of a 64 kHz clock signal received on wire 61a. The three bits outgoing from the counter are present on connection 12a.

RCT can be synchronised by a parallel loading signal, received through wire 90 from a block RTX. This block consists of a multiplexer allowing the choice between two synchronising possibilities. The first choice is that of utilising the signals present on wire 16, which are internally generated by block RSI (FIGS. 2, 8), the other is that of using the signals present on wire 61b, arriving from the outside of the interface, which indicate the correct octet timing. The choice depends on the signal present on wire 61c, generated by the microprocessor.

At the output, on connection 12b, there are two octet clock signals, phase shifted between each other by a clock interval. Said signals, on which the timing of the rest of the interface depends, are generated by a block RTO, consisting of a decoder which operates on three bits of counter RTC supplied on connection 91, and of flip-flops which perform the phase shift.

Analogously RTR generates on connection 12c a bit masking signal and a reset signal for computation of CRC by block RCR (FIGS. 2, 6) by using the timings present on connection 92.

Figure 10:
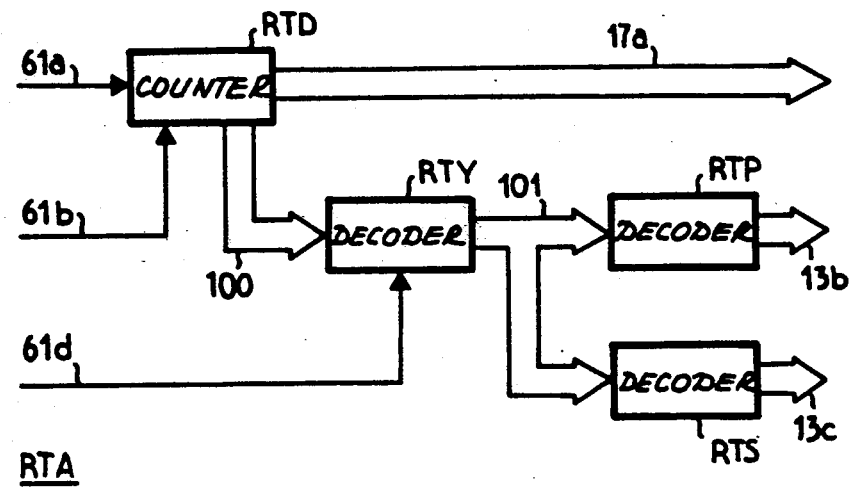
FIG. 10 is a block diagram of the block denoted by RTA in FIG. 2.

The block denoted by RTA in FIG. 2 is shown in greater detail in the block diagram of FIG. 10.

It comprises a block RTD, consisting of a modulo-64 counter, wherein the three most significant bits are used to number the bits within the octet received in function of the 256 kHz clock signal received on wire 61a, in case protocol IOM has been chosen. The three bits outgoing from counter RTD are present on connection 13a. RTD can be synchronised by a parallel loading signal, received through wire 61b.

A decoder RTY generates an active signal in correspondence with the first or second 16 clock intervals, starting from value 0 of the counter, in function of the logic level of the signal present on wire 61d, by using the two most significant bits supplied by counter RTD on connection 100. In such a way the reception from channel B1 or B2 of protocol IOM can be chosen. The said signal, generated by RTY on connection 101, is used by block RTP to generate two octet clock signals phase shifted between each other by a clock interval, so as to supply the interface on connection 13b with the signals for sampling the octet in a phase and process it in the subsequent one. RTP comprises a decoder, which detects the value 62 of counter RTD by operating on the timing signals supplied by RTY, as well as a flip flop which perform phase shift.

A block RTS, analogously to RTP, generates a bit masking signal and a reset signal for computing CRC by block RCR (FIGS. 2, 6).

The masking is envisaged by Rec. H221 for 64 kbit/s standard operation as well as for the operation according to protocol IOM to prevent the four bits of CRC calculated by the remote transmitter from being received and hence considered in local CRC computation.

Figure 11:
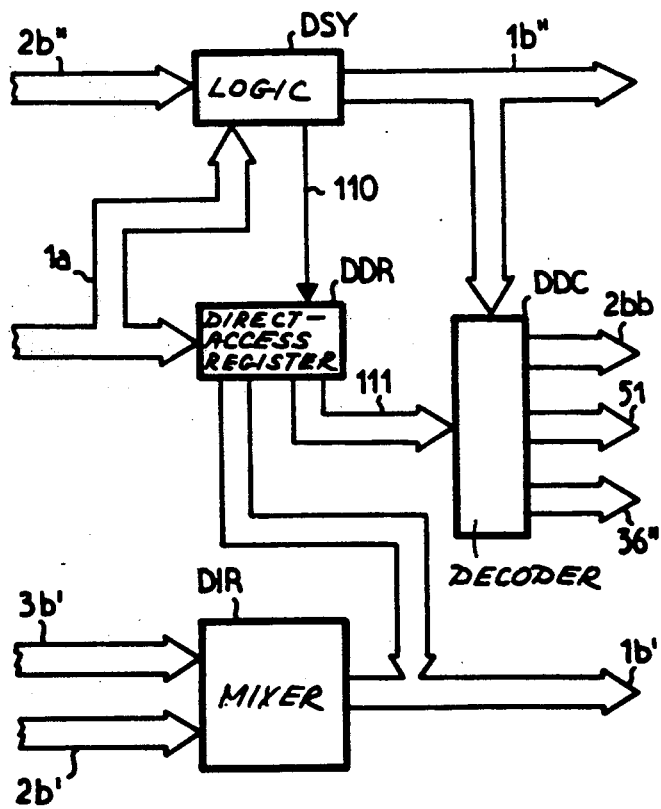
FIG. 11 is a block diagram of the block denoted by DEC in FIG. 4.

The block denoted by DEC in FIG. 4 is shown in greater detail in the block diagram of FIG. 11.

Block DDR is a direct-access register for microprocessor writing. It consists of 5 cells, 3 of which are used to store addresses for other 8 registers allocated in different interface places. These registers contain both the data received and the data to be transmitted, the data relevant to channel AC, to BAS, to receiver/transmitter frame and multiframe counters, etc. The addresses at the outputs of said 3 cells are present on connection 111 and enter a decoder DDC.

The fourth DDR cell contains a start bit for the transmitter and the fifth contains a bit utilised for the interface test; both bits are available on connection 1b'. The microprocessor performs the writing operations in DDR through connection 1a.

A block DIR mixes the different transmitter, receiver and error interrupt signals, arriving through connections 2b' and 3b', and sends the resulting signal on connection 1b'.

Block DSY is a decoder receiving on connection 2b" microprocessor control signals, namely signals called "Chip select", "read/write", "command data" and "data strobe", and in function of their value it selects different parts the internal logic.

Chip select signal enables the interface, read/write signal specifies whether the microprocessor is performing writing or reading operations, command data signal allows direct microprocessor access to register DDR, enabled by the signal on wire 110, or to the 8 indirect access registers and finally data strobe signal indicates the validity period of the data under reading and writing.

Block DSY responds to the data strobe signal with a data acknowledge signal on connection 1b", directed towards the microprocessor, by implementing in that way a data exchange asynchronous- protocol. Block DSY also contains a logic for resetting the interrupt conditions. It uses a signal composed of three bits, sent by microprocessor on connection 1a during the writing phase of block DDR, and sends it onto connection 1b" towards the logics for generating receiver, transmitter and error interrupts.

Finally decoder DDC decodes the three bits arriving on connection 111 and uses them to generate 8 enabling signals in writing and 8 enabling signals in reading, by exploiting the read/write signal present on connection 1b". Output signals are present on connection 51, 2bb, 3b".

Figure 12:
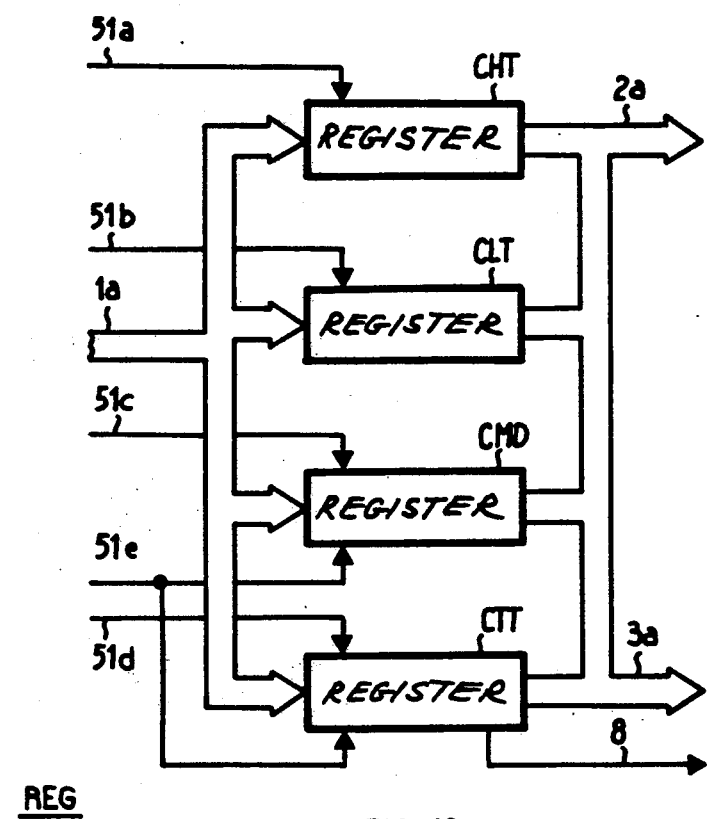
FIG. 12 is a block diagram of the block denoted by REG in FIG. 4.

The block denoted by REG in FIG. 4 is shown in greater detail in the block diagram of FIG. 12.

As previously mentioned, REG comprises four registers, CHT included, an 8-bit indirect access register, selected through the signal on wire 51a, wherein the microprocessor writes through the connection 1a the eight most significant bits of a word for loading the counters contained both in the transmitter and in the receiver for testing the circuit. Said bits are emitted on connections 2a and 3a, directed respectively towards the receiver and the transmitter.

Block CLT is equal to block CHT, but it contains the least significant bits of the test word. It is selected through the signal on wire 51b and emits the output bits on connections 2a and 3a.

Block CMD is still an 8 bit register, selected through the signal on wire 51c, wherein there are stored bits for the circuit configuration under normal operating conditions. Among these bits, one specifies whether the circuit is to construct frame H221, one if the channel AC is supplied in serial or in parallel form, one if on the external line there is present the octet synchronism for the receiver, one if CRC computation of the transmitter is enabled, etc. They are sent to the transmitter and to the receiver through connections 2a and 3a.

Block CMD receives from the outside through wire 51e the initialisation signal whereby it is set for the standard operating conditions. In this way it is unnecessary to act on the register for configurating the component. Said characteristic is particularly useful for the autonomous operation.

Finally block CCT is the register containing control information for the circuit test. The microprocessor reads the register through connection 1a and the selection is performed through the signal on wire 51d. CTT sends on wire 8 a signal enabling recirculation of the receiver output in the receiver itself.

Block CTT contains some bits enabling receiver and-/or transmitter counters to be loaded with the contents of registers CHT and CLT, a bit enabling the output of read only memory RM (FIG. 2) of the receiver for a check of its contents, another bit allows the receiver finite-state automaton to be reset, etc. The signal on wire 51e inhibits all the test functions at the start.

Figure 13:
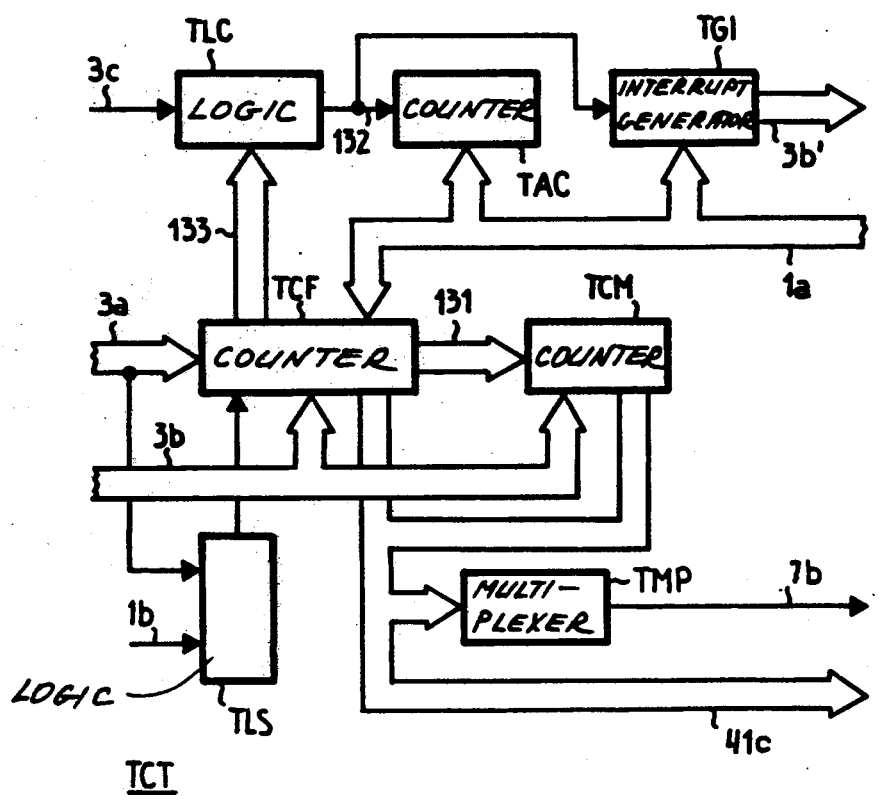
FIG. 13 is a block diagram of the block denoted by TCT in FIG. 3.

The block denoted by TCT in FIG. 3 is shown in greater detail in the block diagram of FIG. 13.

An octet clock signal arrives on connection 3a and is sent to a frame and octet counter TCF, which consequently generates timing signals for the whole transmitter. The counting is synchronously started by a logic TLS, reset by the signal present on wire 3a and controlled by the signal on wire 1b, which is relevant to the state of a bit written in register DDR (FIG. 11) and is used by the microprocessor for synchronous transmitter start. The counters contained in block TCF are on the contrary reset at the start.

The data for fast increment of the counters during the test phase are present on connection 3b. The frame counter state can be read by the external microprocessor by a suitable request performed through connection 1a.

The bits outgoing from TCF, representing the counting carried out, result available on connection 41c, and are used by the remaining transmittercircuits. A part of said bits, present on connection 131, are forwarded to a successive multiframe counter TCM, which supplies a signal used to number the outgoing frames from 0 to 15, generating the timing for the construction of the multiframe structure. Even this timing is present on connection 41c.

Connection 41c is also connected to a multiplexer TMP, which uses the received signal to generate a frame synchronism with variable duty-cycle, available on wire 7b.

An auxiliary channel counter TAC counts with modulo 8 the clock signal pulses it receives at the input on wire 132. Said pulses are generated by a conditioning logic TLC on the basis of the octet clock signal present on wire 3c, taking into account the value frame counter TCF renders available on connection 133. More particularly, TLC generates on wire 132 eight clock pulses (one every eight octets) located starting from the octet 16 to octet 80 in correspondence with auxiliary channel AC. The counting carried out by TAC is read by the external microprocessor through connection 1a.

A block TGI generates an interrupt signal, which originates in correspondence with the transitions at the output of logic TLC. The interrupt signal on wire 3b' is then sent to block IP (FIG. 4) to be mixed with the receiver interrupts.

Signals can also be sent by the microprocessor on wire 3b' for the loading of suitable binary configurations in counter TCM to be used during the test phase.

Figure 14:
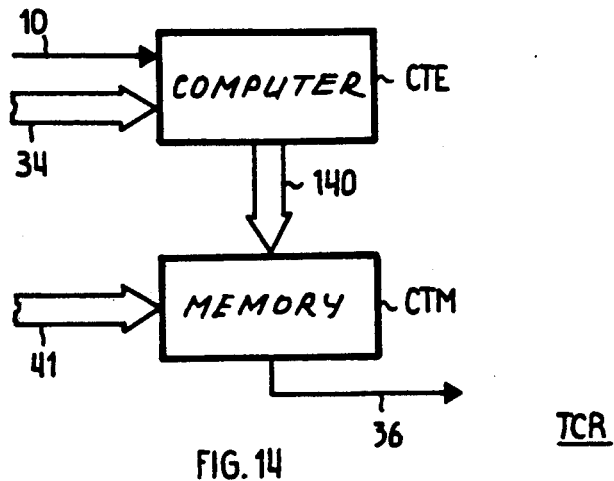
FIG. 14 is a block diagram of the block denoted by TCR in FIG. 3.

The block denoted by TCR in FIG. 3 is shown in greater detail in the block diagram of FIG. 14.

Wire 10 carries the serial data flow where upon CRC has to be computed. Block GTE computes CRC in the usual modes by using the timing signals present on connection 34, consisting of a clock and a reset signal.

Calculated code CRC is supplied on connection 140 to be forwarded to a block CTM, which memorises and supplies it under serial form on wire 36. The timing specifying the suitable instant of the data output on wire 36 is supplied on connection 41 by block TMA (FIG. 3).

Figure 15:
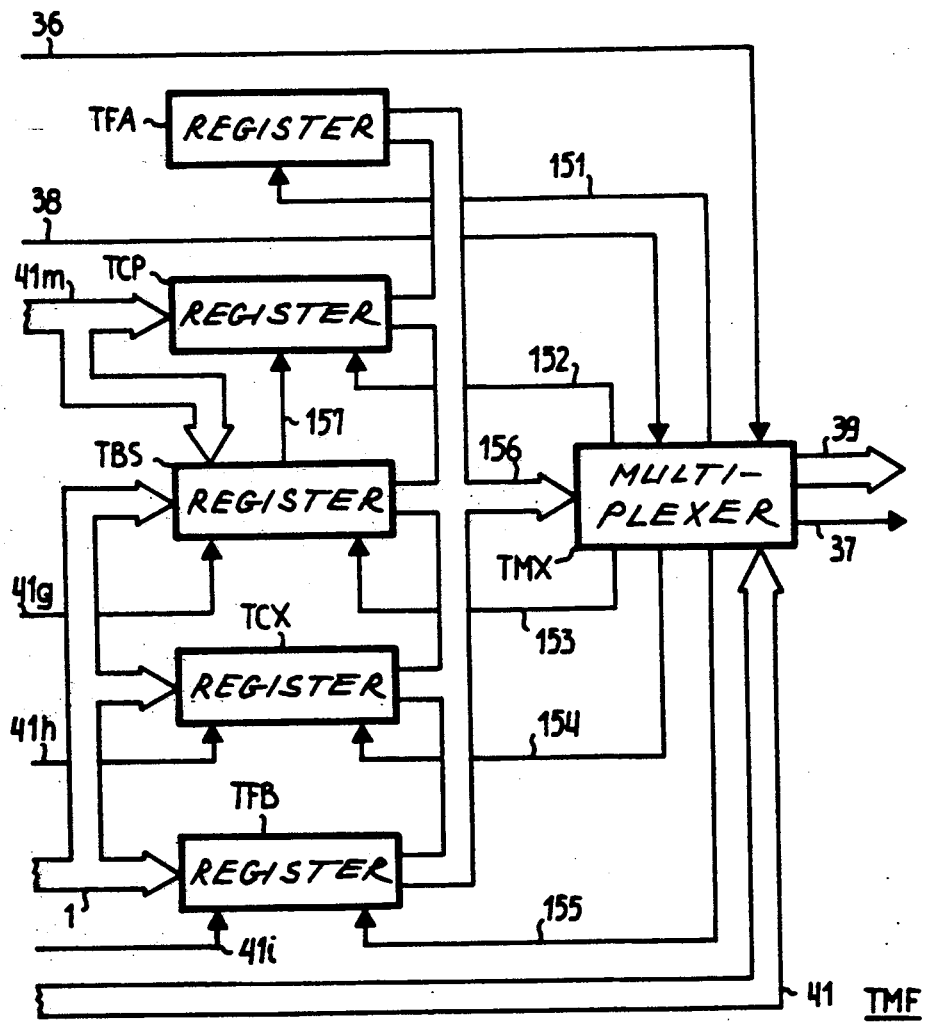
FIG. 15 is a block diagram of the block denoted by TMF in FIG. 3.

The block denoted by TMF in FIG. 3 is shown in greater detail in the block diagram of FIG. 15.

This block basically consists of five registers TFA,TFB,TCP,TBS,TCX and of a multiplexer TMX.

Register TFA contains word FAS under wired form. In function of the signal on wire 151 this word is presented on connection 156 connected to multiplexer TMX, as well as the other outputs of the other four registers.

Block TCP is a shift register which is used to compute the parity of word BAS. The timing arrives through connection 41m from block TCT (FIG. 3). Word BAS enters under serial form on wire 157. The calculated parity word is presented on connection 156 under request of the multiplexer on wire 152.

Shift register TBS contains word BAS to be transmitted. The external microprocessor writes this word through connection 1, by enabling the writing in TBS trough enabling wire 41g. Word BAS is presented in parallel from on connection 156 upon request of TMX, sent on wire 153. The timing for the serialisation of word BAS outgoing on wire 157 is supplied through connection 41m.

Register TCX contains the value of channel AC to be transmitted. The external microprocessor writes this value through connection 1, by enabling the writing in TCX through enabling wire 41h. The value of channel AC is presented under parallel form on connection 156 upon TMX request, sent on wire 154.

Register TFB contains the data relevant to the multiframe structure to be transmitted. The external microprocessor writes said data through connection 1, by enabling the writing in TFB through enabling wire 41i. The data are presented under parallel form on connection 156 upon TMX request, sent on wire 155.

Multiplexer TMX mixes the data requested through wire 151, . . ., 155,present on connection 156 at determined instants, with the signals present on wires 36 and 38. On wire 36 there is under serial form the value calculated by block TCR (FIG. 3) relevant to CRC, while on wire 38 there is subchannel 8.

TMX, under the control of the timing signals present on connection 41 forms the frame structure by positioning at suitable instants in the subchannel 8 BAS,FAS, parity, CRC and AC data.

It builds also the multiframe structure. The multiframe synchronism word is wired inside block TMX and is transmitted at determined instants as bit 8 of the first octet of an even frame.

The data switched are serially presented on wire 37, whilst on connection 39 there is the timing for the transfer of the octet outgoing from block TSI to block TSO (FIG. 3).

Figure 16:
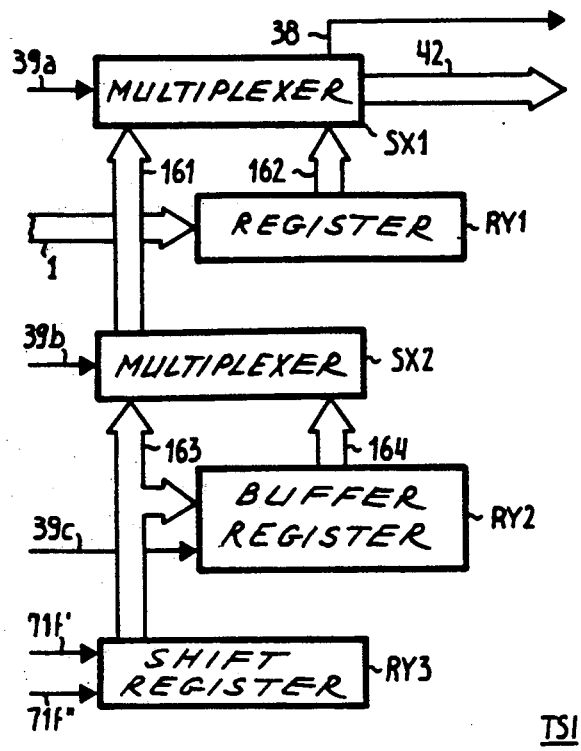
FIG. 16 is a block diagram of the block denoted by TS1 in FIG. 3.

The block denoted by TSI in FIG. 3 is represented in greater detail in the block diagram of FIG. 16.

Block RY3 is a shift register which receives the data in serial form on wire 71f and the relevant clock signal on wire 71f'. At the output RY3 emits data in parallel form on connection 163, connected to a multiplexer SX2 and to a buffer register RY2. This register is used to temporarily store the datum to be transmitted when protocol IOM is used and the datum is positioned in position B2. In this way register RY3 is allowed to receive new data. RY2 output is connected to connection 164. RY2 is loaded through a signal present on wire 39c coming from block TMF.

Multiplexer SX2 allows the choice between 64 kbit/s standard operation and protocol IOM in B1, by extracting the data from connection 163, or the protocol IOM in B2, by extracting the data from connection 164. The selection is performed on the basis of the signal received on wire 39b and the output is made available on connection 161.

Block RY1 is a register whose input receives the data in parallel form. In it the microprocessor can write through connection 1 the datum to be transmitted, which will be available on connection 162. Block SX1 is a multiplexer which receives the data in parallel form on connection 161, relevant to the data received under serial form and on connection 162, relevant to the data received under parallel form, and transfers the former or the latter data to the output according to the logic level of the signal on wire 39a. More particularly, on the output connected to connection 42, there is the data located in the subchannels 1 to 7, whilst on wire 38 there is the datum placed in subchannel 8.

Figure 17:
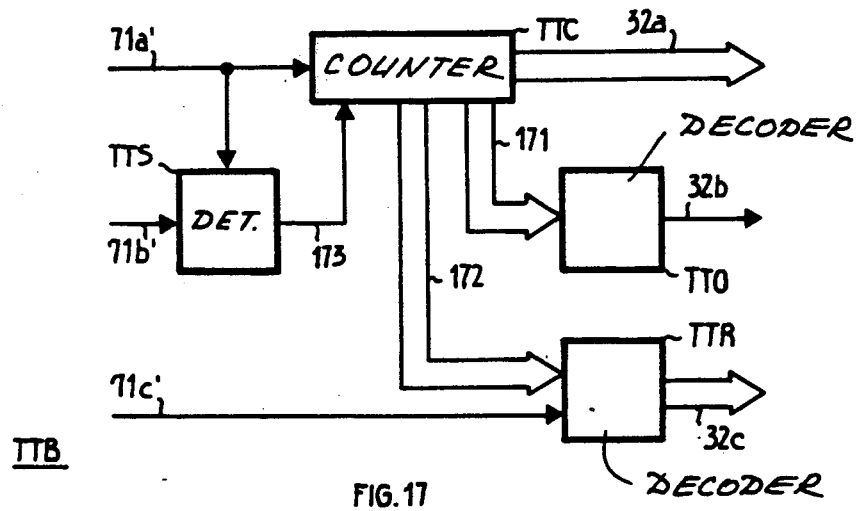
FIG. 17 is a block diagram of the block denoted by TTB in FIG. 3.

The block denoted by TTB in FIG. 3 is shown in greater detail in the block diagram of FIG. 17.

It comprises a block TTC, which consists of a modulo 8 counter which numbers the bits inside the octet to be transmitted on the basis of the 64 kHz clock signal received on wire 71a'. The three bits outgoing from the counter are present on connection 32a.

TTC can be synchronised by a parallel load signal, received through wire 173 from block TTS. The latter block detects the presence of an octet synchronism signal on wire 71b and transfers it on wire 173 on the basis of the timing signals present on wire 71a'.

At the output, on wire 32b, there is an octet clock signal, which controls the loading of output serial register TSO (FIG. 3) through block TMA (FIG. 3). It is generated by a block TTO, consisting of a decoder operating on the three bits of the counter TTC supplied on connection 171 and of flip-flops. Analogously, by acting on the signals present on connection 172, TTR generates on connection 32c a bit masking signal, a transfer signal and a reset signal for computing CRC by block TCR (FIG. 3, 14) whereto they are sent through block TMA (FIG. 3). On wire 71c there is a signal for the initial reset.

Figure 18:
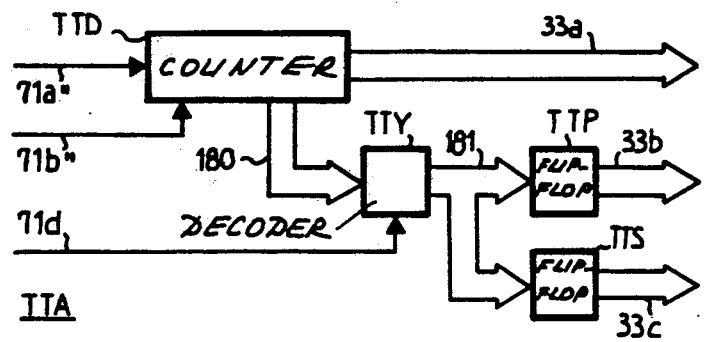
FIG. 18 is a block diagram of the block denoted by TTA in FIG. 3.

The block denoted by TTA in FIG. 3 is shown in greater detail in the block diagram of FIG. 18.

It comprises a block TTD, consisting of a modulo-64 counter, where the three most significant bits are used to number the bits inside the octet to be transmitted on the basis of 256 kHz clock signal received on wire 71a", in the case in which protocol IOM is used. The three bits outgoing from TTD are present on connection 33a. TTD can be synchronised by a parallel load signal, received through wire 71b".

A decoder TTY generates an active signal in correspondence with the first or second 16 clock intervals starting from value 0 of the counter, in function of the logic level of the signal present on wire 71d, by using the two most significant bits supplied by counter TTD on connection 180. In such a way it is possible to choose the transmission on channel B1 or B2 of protocol IOM. The signal above, generated by TTY on connection 181, is used by block TTP to generate on connection 33b two signals, a clock signal and a loading signal for the control of the loading and shift operations in the output register TSO (FIG. 3). TTP is composed of flip-flops which receive the signals present on connection 181.

A block TTS, analogously to TTP, generates a bit masking signal and a reset signal for computing CRC by block TCR (FIGS. 3, 14).

The masking is provided by Rec. H221 for the 64 kbit/s standard operation and for the operation according to IOM protocol to avoid that 4 bits of CRC previously computed and in phase of transmission affect the computation of the next CRC.

We claim:

1. A multimedia protocol interface for 64 kbit/s data flow organized according to the frame structure as defined in Rec. H221 of CCITT, and emitted and received according to standard 64 kbit/s protocol or according to 10M 256 kbit/s protocol, which is capable of operating autonomously or aided by an external microprocessor, comprising a receiver, a transmitter, a control block and means for the local test of the interface itself, and said receiver comprising:

a first block which generates internal timing signals relevant to a 64 kbit/s operating mode, on the basis of the clock and synchronism signals received with said data flow;

a second block which generates internal timing signals relevant to an operating mode according to the 256 kbit/s IOM protocol, on the basis of clock and synchronism signals received with said data flow;

a third block, consisting of a multiplexer, which selects a reception protocol forwarding timing signals supplied by the first block or by the second block;

a fourth block searching in the data flow a synchronism word for aligning a received octet, on the basis of clock signals received from the third block;

a fifth block which performs frame and multiframe alignment generating suitable signals and correction of errors of a word BAS;

a sixth block (RM), comprising a read only memory, which, on the basis of a possible erroneous word received from said fifth block, generates a signal on a position of possible bits of the word to be corrected or emits a signal indicating the impossibility of the correction owing to an excessive number of errors;

a seventh block for counting an octet number inside a submultiframe, and generating frame synchronism signals and generating "interrupt" signals relevant to the receiver and to the presence of errors in the receiver;

an eighth block implementing an error signalling protocol based on code CRC, received together with data from the fourth block, on the basis of timing signals received from the third block;

a ninth block converting into serial form data received from the fourth block;

said transmitter comprising:

a tenth block generating internal timing signals relevant to the 64 kbit/s operating mode, on the basis of clock and synchronism signals;

an eleventh block generating internal timing signals relevant to the operating mode according to 256 kbit/s 10M protocol, on the basis of clock and synchronism signals;

a twelfth block selecting a transmission protocol by forwarding timing signals supplied by the tenth block or eleventh block;

a thirteenth block, which counts an octet number inside a submultiframe, generates frame synchronism signals and generates interrupt signals;

a fourteenth block which implements an error signalling protocol calculating code CRC on data to be transmitted, on the basis of the timing signals received from the twelfth block;

a fifteenth block which converts into parallel form data of subchannels 1 to 7 received in serial or parallel form and data of subchannel 8;

a sixteenth block for mixing information relevant to CRC, FAS, BAS, and a channel AC received or generated to form a channel 8, on the basis of timing signals received from the thirteenth block;

a seventeenth block which converts data arriving from the fifteenth block and from the sixteenth block into serial form for the transmission;

said control block comprising:

an eighteenth block, generating address and control signals for internal registers on the basis of address and control signals supplied by said external microprocessor or on the basis of signals, non microprocessor-controlled, for the choice of the interface operation between autonomous operation or microprocessor-controlled operation, mixes interrupt signals of the receiver and and of the transmitter and sends them to the external microprocessor and renders available outside a few bits of protocol H221; and a nineteenth block containing the data for tests, the type of test and the configuration relevant to the type of operation;

said means for the local test enabling connection of an output of the transmitter to an input of the receiver.

2. A multimedia protocol interface as in claim 1, wherein said first block comprises:

a first counter, which enumerates bits inside an octet received on the basis of a clock signal and on a parallel loading signal;

a first multiplexer allowing a choice between signals generated by the fourth block and signals coming from outside the interface, on the basis of a signal generated by the external microprocessor;

a twentieth block generating two octet clock signals phase shifted between each other by a clock interval, on the basis of a count supplied by said first counter; and a twenty-first block which generates a bit masking signal and reset signal for calculating CRC on the basis of a count supplied by said first counter.

3. A multimedia protocol interface as in claim 2, wherein said second block comprises:

a second counter, which enumerates bits inside the octet received on the basis of a clock signal and a parallel loading signal;

a first decoder which generates an active signal in correspondence with a first or second clock intervals starting from a value 0 of the said second counter, which supplies the two most significant bits;

a twenty-second block which generates two octet clock signals phase-shifted between each other by a clock interval by operating on the signals supplied by said second counter, and by said first decoder; and a twenty-third block which generates a bit masking signal and a reset signal for computing CRC, by operating on the signals supplied by said second counter and by said first decoder.

4. A multimedia protocol interface as in claim 3, wherein said fourth block comprises:

a first shift register, converting the arriving serial flow into parallel form using for timing the signals supplied by said third block;

a bank of shift registers, each connected to a parallel output of said first shift register, timed by signals supplied by said third block and housing a combinatory circuit for recognizing the synchronism word FAS;

a second multiplexer which sequentially scans the signals at the output from said bank of shift registers, under the control of a signal supplied by the third block;

a first finite state automaton, which on the basis of a signal received from the second multiplexer checks whether and in which register of the bank there is the synchronism word FAS, indicating that its identification has taken place.

5. A multimedia protocol interface as in claim 4, wherein said fifth block comprises:

a second finite-state automaton which checks whether frame synchronism has actually been achieved or has been accidentally lost, by looking for the synchronism word FAS and signalling the result to said seventh block, to the fourth block and to a third finite-state automaton, from which effects a check in response to signals arriving with a start signal from the fourth block and timing signals arriving from the seventh block, said third finite-state automaton checking whether frame synchronism has been actually achieved or has been accidentally lost, and signalling its result to said seventh block (RCT) at which it effects a check in response to signals arriving from said second finite-state automaton (MSF) and from a twenty-fourth block (MAW), said twenty-fourth block (MAW) storing information relevant to a multiframe structure it receives from said fourth block, by recognizing a multiframe synchronism word, and which divides the word BAS and its parity by a generator polynomial, supplying the rest at an output;

a twenty-fifth block, including a multiplexer which connects input connections with output connections and an error detector for the word BAS, which indicates presence of one or of two errors which have been corrected or of three errors which could not be corrected; and a twenty-sixth block which effects the actual correction of the word BAS arrived from said fourth block by storing it in a a register and complementing the erroneous bits signalled by said sixth block, a register being provided for memorizing data relevant to the auxiliary channel AC.

6. A multimedia protocol interface as in claim 5, wherein said seventh block comprises:

a third octet and frame counter, which, on the basis of an octet clock signal generates timing signals for the whole receiver, after reaching frame synchronism and octet synchronism;

a first logic, which on the basis of signals coming from said control block and from said fifth block, starts in a synchronous mode said third counter;

a fourth counter, which on the basis of a portion of counting supplied by said third counter indicates at the output if the arriving frame is odd or even;

a third multiplexer which on the basis of the counting supplied by the third counter generates a frame synchronism with variable duty cycle;

a second conditioning logic, which generates eight clock pulses positioned starting from octet 16 to octet 80 in correspondence with the auxiliary channel AC, on the basis of a count supplied by the third counter and of an octet clock signal;

a fifth auxiliary channel counter, which obtains the count generated by said second logic for the external microprocessor; and a twenty-seventh block which generates an interrupt signal, which has origin in correspondence with the transitions at the output of said second logic or in correspondence with error situations inside the receiver.

7. A multimedia protocol interface as in claim 6, wherein said eighth block comprises:

a twenty-eighth block calculating the cyclic redundancy code CRC on the serial data flow coming from said fourth block;

a twenty-ninth block which stores the CRC calculated by the twenty-eighth block and compares it with the received code;

a thirtieth block which stores the result of the comparison made by the twenty-ninth block and renders it available to the external microprocessor and to said twenty-seventh block;

a thirty-first block, storing information relevant to protocol H221 and controlling CRC bits.

8. A multimedia protocol interface as in claim 7, wherein said tenth block comprises:

a sixth counter (TTC) which enumerates the bits inside the octet to be transmitted on the basis of a 64 kHz clock signal;

a thirty-second block, which on the basis of an octet synchronism signal emits a parallel loading signal for said sixth counter;

a thirty-third block which generates an octet clock signal on the basis of a count performed by the sixth counter; and a thirty-fourth block, which generates a bit masking signal, a transfer signal and a reset signal for calculating said cyclic redundancy code CRC on the basis of the count performed by the sixth counter.

9. A multimedia protocol interface as in claim 8, wherein said eleventh block comprises:

a seventh counter, which enumerates the bits inside the octet to be transmitted on the basis of a 256 kHz clock signal and is adapted to be loaded in parallel;

a second decoder, which on the basis of a count supplied by said seventh counter generates a signal active in correspondence with the first or second clock intervals starting from value 0;

a thirty-fifth block, which generates a clock signal and a loading signal for the check of loading and shift operations in said seventeenth block; and a thirty-sixth block, which generates a bit masking signal and a reset signal for computing CRC by said fourteenth block.

10. A multimedia protocol interface as in claim 9, wherein said thirteenth block comprises:

an eighth counter of octet and frame, which on the basis of an octet clock signal generates timing signals for the transmitter;

a third logic, which on the basis of signals coming from the control block and from the external microprocessor, synchronously starts said eighth counter;

a ninth counter, which on the basis of a part of count supplied by said eighth counter, emits a signal used to enumerate the outgoing frames from 0 to 15, generating the timing for the building of multiframe structure;

a fourth multiplexer which on the basis of the count supplied by said eighth counter, generates a frame synchronism with variable duty cycle;

a fourth conditioning logic, which generates eight clock pulses positioned starting from octet 16 to octet 80 in correspondence with the auxiliary channel, on the basis of the count supplied by the eighth counter and of an octet clock signal;

a tenth counter of auxiliary channel, which obtains the counting of the pulses generated by said fourth logic for the external microprocessor; and a thirty-seventh block generating an interrupt signal, which has origin in correspondence with the transitions at the output of the fourth logic.

11. A multimedia protocol interface as in claim 10, wherein said fourteenth block comprises:

a thirty-eighth block which calculates the cyclic redundancy code CRC on the serial data flow coming from the seventeenth block; and a thirty-ninth block which memorizes said cyclic redundancy code CRC computed by said thirty-eighth block and emits it in serial form.

12. A multimedia protocol interface as in claim 11, wherein said fifteenth block comprises:

a second shift register, which receives data in serial form and a relevant clock signal and emits them in parallel form;

a first register which memorizes the data placed in the position to be transmitted according to 10M protocol;

a fifth multiplexer, which transfers to the output the data supplied by said second shift register or by the first register;

a second register which memorizes the data in parallel form supplied by the microprocessor;

a sixth multiplexer, which transfers to the output the data supplied by the fifth multiplexer or by the second register.

13. A multimedia protocol interface as in claim 12, wherein said sixteenth block comprises:

a third register, containing word FAS in wired form;

a third shift register for calculating the parity of word BAS;

a fourth shift register, to supply (under) in parallel form and in serial form the word BAS to be transmitted, received from the external microprocessor;

a fourth register, to supply in parallel channel AC to be transmitted, received from the external microprocessor;

a fifth register, to supply in parallel the data relevant to the multiframe to be transmitted, received from the external microprocessor; and a seventh multiplexer, which mixes the data supplied by said registers on its request with signals relevant to CRC and to subchannel 8, forming the frame and multiframe structure under the control of timing signals.

14. A multimedia protocol interface as in claim 13, wherein said eighteenth block comprises:
 a sixth register, for writing by the microprocessor;
 a third decoder which receives a portion of data memorized in the sixth register and uses them to generate enabling signals in reading and writing in a function of a reading/writing signal;
 a foutieth block mixing interrupt signals of the receiver, of the emitter and of error; and
 a fourth decoder which receives control signals from the microprocessor and on the basis of their values selects different parts of the internal logic, confirms data reception by implementing an asynchronous protocol and resets interrupt conditions.

15. A multimedia protocol interface as in claim 14, wherein said nineteenth block (REG) comprises:
 a seventh register and an eighth register, wherein the microprocessor writes words for loading the counters contained both in the transmitter, and in the receiver for test;
 a ninth register, wherein the microprocessor writes words for the configuration of the interface in normal operation; and
 a tenth register, wherein the microprocessor writes control information for the circuit test.

* * * * *